July 22, 1947.　　　F. C. ANDERSON　　　2,424,215
PARACHUTE RELEASE
Filed Oct. 16, 1945　　　2 Sheets-Sheet 1
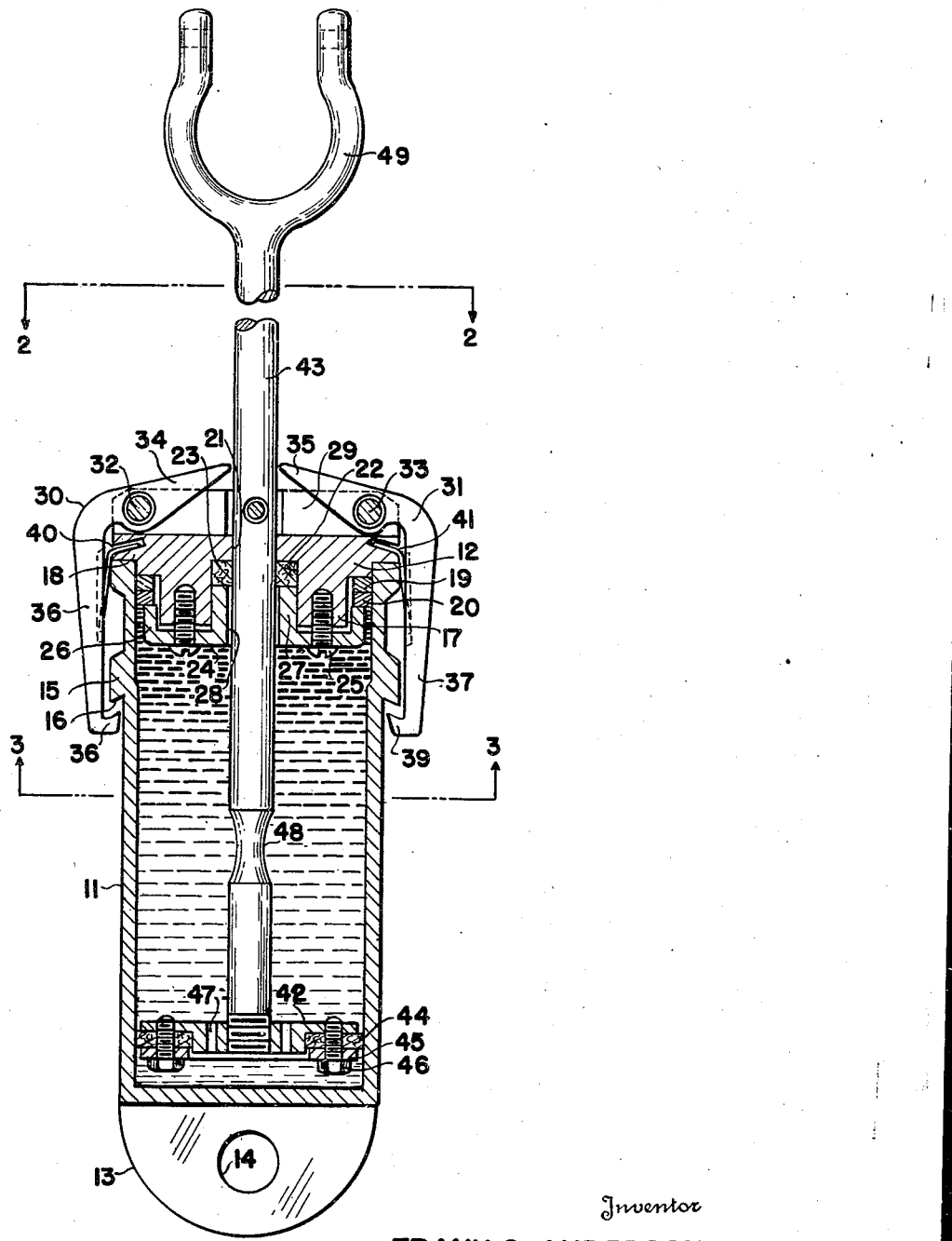
FIG. I
Inventor
FRANK C. ANDERSON
By Ralph L Chappell
Attorney July 22, 1947.  F. C. ANDERSON  2,424,215
PARACHUTE RELEASE
Filed Oct. 16, 1945  2 Sheets-Sheet 2

Inventor
FRANK C. ANDERSON
By Ralph C. Chappell
Attorney

Patented July 22, 1947

2,424,215

UNITED STATES PATENT OFFICE 2,424,215

PARACHUTE RELEASE

Frank C. Anderson, United States Coast Guard

Application October 16, 1945, Serial No. 622,671

3 Claims. (Cl. 294—83)

(Granted under the act of March 3, 1883, as amended April 30, 1928; 370 O. G. 757)

This invention relates to releasing gear and more particularly to a parachute release for automatically releasing the load from its parachute when the load hits the ground.

In the parachutes heretofore used, particularly cargo parachutes, no provision has been made for separating the cargo pack from the parachute when the former lands, and as a consequence the parachutes drag the packs affixed thereto along the ground for some distance before collapsing. This dragging not only tends to damage the pack and its cargo, but often deposits the pack at a point remote from that intended, or where it first strikes the ground. This objection also applies to parachutes used for personnel. Release of the pack also permits the parachute to collapse immediately, thus avoiding any tearing thereof by being blown against fences, trees and like obstructions.

The violent gyrations of the pack and parachute incident to the dropping thereof from a plane and the opening of the parachute require that the contact releasing gear be proof against any accidental operation thereof during this initial period regardless of the nature of the stresses placed thereupon. It is accordingly the object of the present invention to provide means for detaching a parachute's load from the parachute as soon as the load contacts the ground.

A further object of the invention is to provide means for releasing a load from a parachute upon contacting the ground, but which remains locked against release for a predetermined period after the parachute opens.

A further object of the invention is to render the means for releasing a load from a parachute in condition to operate a short time after the parachute has opened.

A further object of the invention is to provide a means for separating a load from its parachute which is inoperative when dropped from the plane, but arms itself after a predetermined time interval so that the load hitting the ground actuates the releasing means.

A further object of the invention is to provide a means for disconnecting a pack or person from a parachute which is positively locked against release for a predetermined interval of time after the parachute opens and then placing the means in condition such that a jar thereof will actuate the releasing means to disconnect the pack or person from the parachute.

A further object of the invention is to provide a timing device for controlling the arming of a parachute release which is operated by the tension in the release during descent of the parachute and its load.

Other objects of the invention will be more fully disclosed in the following description and claims.

According to the invention, the release comprises separable means having one part or element thereof affixed to the parachute and the other to the pack. These elements are normally held together by coupling means affixed to one element and adapted to engage the other. Means for locking the coupling means in a position such that it will hold the elements together are provided. Means for unlocking the coupling means is associated with a time delayed device to permit the parachute to open and, with its pack, to settle down to an even rate of descent after dropping before the device is armed. That is to say, the means coupling the two elements of the release together cannot operate to permit separation of the two parts until after the lapse of a predetermined period of time after the parachute opens. At the expiration of the period, the coupling means continues to hold the two elements together, but the locking means therefore is no longer operative. Jarring the release with the coupling means unlocked permits disengagement of the coupling means whereupon the elements separate, one remaining with the parachute and the other with the pack. The time delay means operates under the tension existing between the elements during normal descent of the pack and parachute. While the description herein made refers to cargo packs, it is obvious that the invention may be practiced in connection with parachutes used to drop personnel, boats, etc.

In the drawings:

Fig. 1 is a sectional view in elevation of the parachute release.

Fig. 2 a plan view of the release taken along the line 2—2 of Fig. 1.

Figure 5:
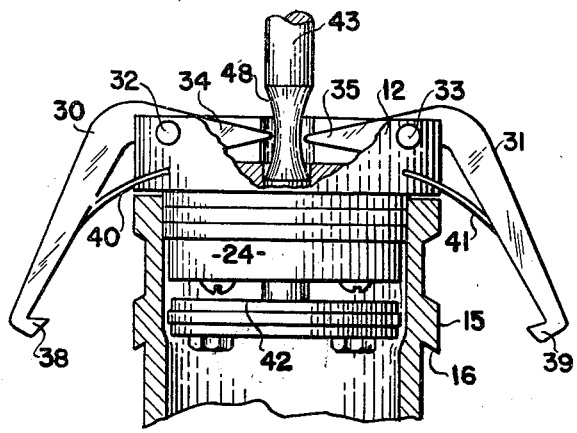
Fig. 5 is a fragmentary sectional view of the release immediately after relative movement of the elements to release the dogs to unlock the two elements so that they may separate.

The two elements of the parachute release comprise a cylinder 11 and a plug 12 removably fitted into the end of the cylinder and mounted on a rod 43. One end of the cylinder is closed and carries an ear 13 provided with an aperture 14 to facilitate attaching the cylinder 11 to the pack (not shown). The cylinder is provided with an annular flange 15, around the outside thereof. The lower face of this flange is undercut to form a lip 16 the surface of which slopes upwardly and inwardly. The inner diameter of the cylinder is increased slightly adjacent the open end thereof for an axial distance corresponding roughly to the thickness of the neck of the plug and the thickness of the piston for a purpose subsequently described.

The plug 12, has a neck 17 which fits loosely in the open end of the cylinder. A flange 18 projects laterally from the upper end of the neck and overlies the end of the cylinder 11. The neck 17 is reduced in diameter at the lower end thereof to permit mounting a pair of oil sealing rings 19 and 20 thereon to engage the inner wall of the cylinder. The plug has a central aperture 21 and a recess 22 aligned therewith to receive packing 23. A gland 24, attached to the inner end of the plug by screws 25, has axially directed annular flanges 26 and 27 for retaining the rings and the packing. The gland has an axial aperture 28 which is in alignment with the aperture 21 in the plug. The outer end of the plug 12 is provided with a diametrical groove 29 extending from one side of the plug to the other and of a depth less than the thickness of the flange 18.

The means for releasably holding or coupling the two parts together comprises a pair of dogs 30 and 31 pivotally mounted on the plug 12. The dogs are in the form of bell cranks and are pivotally mounted on pins 32 and 33, mounted transversely of the groove 29 adjacent the ends thereof. The inner arms 34 and 35 of the bell cranks operate in the groove and the adjacent ends thereof are spaced a short distance apart for a purpose subsequently described. The outer arms 36 and 37 project outwardly and downwardly therefrom in a position adjacent the side of the cylinder 11. The outer ends of the arms 36 and 37 are provided with hooks 38 and 39 of a configuration adapted to engage the lip 16 of the flange 15. The length of the arms 36 and 37 is sufficient to permit the hooks 38 and 39 to clear the lowest edge of the lip 16 when the flange 18 of the plug 12 seats upon the open end of the cylinder 11. Leaf springs 40 and 41 serve to urge the dogs 30 and 31 to rotate in a direction tending to swing the arms 36 and 37 thereof away from the cylinder. These springs each have one end inserted in slots cut into the edge of the flange 18 beneath the ends of the groove 29 and are fastened therein by any suitable means, such as soldering. The free ends of the springs rest in shallow grooves cut in the innerside of the arms 30 and 31 which serve as guides therefor. Any other means of urging the dogs to rotate may, of course, be used and that shown is for illustrative purposes only.

The means for controlling the locking of the dogs and for introducing a time interval into the control thereof comprises a piston 42 and a piston rod 43. The piston operates in cylinder 11 and is provided with a piston ring 44 shown as composed of packing, though any suitable equivalent means may be used, held thereto by a washer 45 affixed to the piston by screws 46. Small apertures or bleeds 47 are drilled through the piston 42 affording a passage from one side thereof to the other.

The piston is affixed to the end of the piston rod 43 by some suitable means such as the threaded arrangement shown. The rod extends through the aperture 21 of the plug and aperture 28 of the gland 24 and projects above the plug, terminating in a clevis 49 adapted to be attached to a parachute (not shown).

The diameter of the piston rod and the spacing between the adjacent ends of the arms 34 and 35 is such that when the rod is placed therebetween as shown in Fig. 1, the dogs are prevented from rotating under the influence of the springs and are held so that the hooks 38 and 39 are positioned beneath the lip 16 which they will engage upon movement of the plug out of the cylinder, thus preventing separation thereof. The plug 12 and cylinder 11 are therefore locked together as long as the piston rod prevents any movement of the dogs.

To unlock the dogs, the rod 43 is provided with a section thereof of a reduced diameter forming a neck 48. This neck is formed on the rod at a point which will place the neck adjacent the free ends of the arms 34 and 35 of the dogs 30 and 31 when the piston is at the upper end of the cylinder 11. The configuration of the neck is substantially the same as the path of the free end of either of the arms when pivoting about the pins upon which they are mounted. Thus it will be seen that when the piston is at the upper end of the cylinder, Fig. 4, the neck 48 of the rod 43 is so positioned with respect to the free ends of the dogs that the rod offers no obstruction to any movement thereof and the dogs are free to rotate under the influence of their respective springs when the hooks disengage the lip, Fig. 5.

Figures 2, 3:
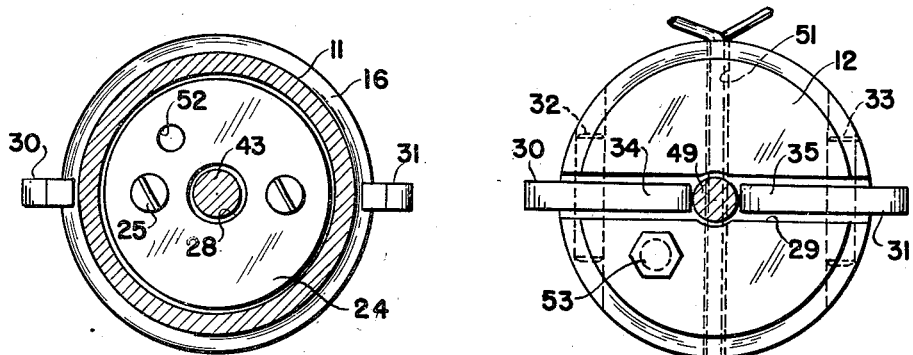
Fig. 3 is a cross sectional view of the release taken along the line 3—3 of Fig. 1.

The plug 12 is provided with a transverse aperture 51 normal to the groove 29 which is adapted to align with an aperture 49, Fig. 2, in the piston rod 43 when the piston is in the position shown in Fig. 1. A cotter pin 50 locks the piston and the plug against relative movement and must be removed before the device can be used.

The plug 12 is also provided with a threaded opening 52 by means of which the cylinder 11 is filled with a liquid such as oil. A threaded plug 53 closes the opening 52 after the cylinder is filled. The fluid in the cylinder flows through the bleeds 47 when the piston is forced to the upper end of the cylinder due to the tension caused by the pack, and provides a means for regulating the period of time required to arm the device by moving the neck 48 to a position adjacent the arms 34 and 35 of the dogs.

The operation of the release is as follows: The clevis 49 is attached to a parachute and the ear 13 to a cargo pack. The cotter pin 50 is removed and the parachute and pack dropped. Rotation of the dogs, under influence of the springs, to remove the hooks 38 and 39 from under the lip 16, is prevented because the free ends of the arms 34 and 35 of the dogs engage the piston rod 43 which is free to slide therebetween. When the parachute snaps open a pull is exerted on the piston rod 43 and the piston which tends to force the plug out of the cylinder by the force transmitted to the plug by means of the fluid in the cylinder. The plug does move a small distance to permit the hooks 38 and 39 to engage the lip 16.

The pull exerted on the piston rod 43 tends to move the piston 42 towards the plug and the rate of movement thereof is controlled by the rate of flow of oil through the bleeds 47 in the piston. It has been determined that a period of 10 seconds should elapse between opening of the parachute and arming of the release to permit the cessation of the violent gyrations incident to the initial opening of the parachute. With the structure shown oil having a viscosity of SAE 30 and a 170 pound pack will produce such period. Other combinations of viscosity and size of the bleed may be used to obtain the same or different time interval. The packing 23 and oil rings 19 and 20 serve to prevent leakage of oil from the cylinder.

Figure 4:
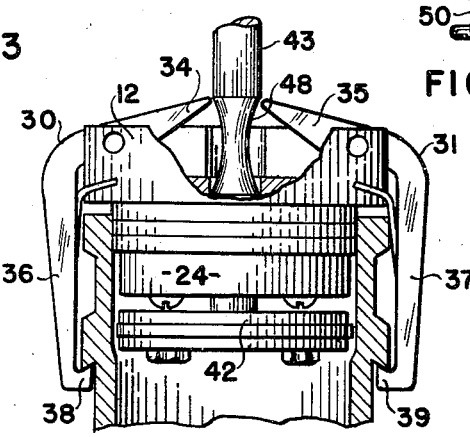
Fig. 4 is a fragmentary sectional view of the release with the dogs unlocked and holding the parts together ready for release upon any relative movement between the two parts.

As the piston reaches the top of its stroke, Fig. 4, it passes into that portion of the cylinder having the larger bore in order that the piston may, in that position, be readily withdrawn from the cylinder without binding. When so positioned the piston abuts the plug and the neck 48 is then adjacent the ends of the arms 34 and 35 of the dogs and the rod no longer serves to lock the dogs in position to engage the cylinder. The dogs are then held into engagement with the cylinder solely by means of the hooks gripping the undercut lip 16 and because of the cooperating shape of the hooks and lip, disengagement thereof cannot be effected as long as there is tension between the plug and cylinder.

When the pack hits the ground, the jar thus caused forces the cylinder and plug together, Fig. 5, relieving the tension between the elements and causing the lip 16 to disengage the hooks 38 and 39 thus releasing the dogs 30 and 31 which immediately rotate about pins 32 and 33 under influence of the springs 40 and 41, freeing the plug from the cylinder. Since the neck 48 of the rod 43 is adjacent the ends 34 and 35 of the dogs, no obstruction to their movement is presented and they assume the position shown in Fig. 5. The parachute then pulls the rod, piston and plug out of the cylinder to disconnect it from the pack which remains where it lands. The parachute, upon release of its load, tends to collapse immediately.

The device may be reassembled for further use by merely inserting the piston 42 in the cylinder 11, an operation facilitated by reason of the enlarged bore of the cylinder adjacent the open end, the dogs are then held with the arms 36 and 37 adjacent the cylinder and the rod push into the cylinder to remove the neck 48 from a point adjacent the ends of the arms 34 and 35 of the dogs, thereby locking and holding them in position to engage the lip on the cylinder. The device, when refilled with oil, is then ready for use.

While I have described the preferred form of my invention I do not wish to limit myself to the precise details as shown but wish to avail myself to such variations and modifications as may come within the scope of the appended claims.

The invention described herein may be manufactured and used by or for the government of the United States of America for governmental purposes without the payment of any royalties thereon or therefor.

I claim:

1. A parachute pack release comprising a cylinder having a closed end and an open end, an undercut flange around said cylinder, a plug adapted to fit in the open end of said cylinder, a bell crank pivoted to said plug, said crank having a hook at one extremity adapted to engage said flange and prevent disengagement of said hook from said cylinder, a spring urging said crank to move said hook away from said flange, an aperture in said plug, a rod extending through said aperture, said rod engaging the other extremity of said crank to hold said hook adjacent said flange, said rod having a reduced section thereon to free said other extremity of said crank to permit movement of said hook away from said flange, a piston in said cylinder affixed to said rod, a bleed in said piston, said cylinder having a fluid therein to regulate the movement of said piston, whereby the weight of the pack will move the rod to position the reduced section thereof to free the said crank for rotation upon relative movement of said cylinder and plug.

2. A parachute pack release comprising a cylinder closed at one end, a rod projecting from said cylinder, means for regulating removal of said rod from said cylinder, a plug closing the end of said cylinder and through which the said rod projects, and means for releasably holding said plug and cylinder together comprising a bell crank pivoted to said plug, said crank having one arm adapted to engage said cylinder and another arm bearing on said rod to hold said one arm in engagement with said cylinder, a spring acting on said crank to rotate said one arm out of engagement with said cylinder, said rod having means thereon for freeing the said other end when said rod is partially withdrawn from said cylinder to permit rotation of said crank, whereby said one arm will disengage said cylinder upon relative movement between said plug and cylinder.

3. In a parachute pack release a first means attachable to a load and comprising a cylinder having one open end and a flange around said cylinder having an undercut lip, a second means attachable to a parachute and comprising a rod, a piston attached to one end of said rod and adapted to fit in said cylinder, means for coupling said first means to said second means comprising a plug adapted to close the end of said cylinder through which said rod passes, cranks pivoted on said plug, one end of said cranks having hooks adapted to grip said lip, the other ends of said cranks adapted to abut said rod to hold said hooks in position to engage said lip, springs urging said hooks away from said lip, said rod having a reduced section adapted to be moved adjacent the said other ends of said cranks to free the cranks for rotation after an interval of time governed by the movement of said piston in said cylinder, whereby relative movement of said plug and said first means caused by impact with the ground will free said hook from said lip to permit separation of said first and second means.

FRANK C. ANDERSON.

REFERENCES CITED

The following references are of record in the file of this patent:

UNITED STATES PATENTS

| Number | Name | Date |
| --- | --- | --- |
| 2,373,386 | De Freitas | Apr. 10, 1945 |
| 2,386,932 | Cooper | Oct. 16, 1945 |

FOREIGN PATENTS

| Number | Country | Date |
| --- | --- | --- |
| 118,090 | Australia | Feb. 2, 1944 |